May 9, 1967  J. W. PAYNE ET AL  3,318,136
METHOD AND APPARATUS FOR TESTING FUELS
Filed June 9, 1964  10 Sheets-Sheet 1

INVENTORS.
JOHN W. PAYNE,
HARRY R. WEBER &
BY WILLIAM E. BEAL

*Oswald N. Hayes*
their ATTORNEYS

May 9, 1967    J. W. PAYNE ET AL    3,318,136
METHOD AND APPARATUS FOR TESTING FUELS
Filed June 9, 1964                                   10 Sheets-Sheet 8

INVENTORS.
JOHN W. PAYNE,
HARRY R. WEBER &
BY WILLIAM E. BEAL their ATTORNEYS

United States Patent Office 3,318,136
Patented May 9, 1967

3,318,136
METHOD AND APPARATUS FOR TESTING FUELS
John W. Payne, Woodbury, Harry R. Weber, Haddonfield, and William E. Beal, Glassboro, N.J., assignors to Mobil Oil Corporation, a corporation of New York
Filed June 9, 1964, Ser. No. 373,620
14 Claims. (Cl. 73—35)

This invention relates to testing procedures and, more particularly, to the testing of a motor fuel to determine its combustion quality.

A motor fuel, in particular a gasoline, is rated in terms of an octane number, the magnitude of which is inversely related to the tendency of the gasoline to detonate when undergoing combustion. In accordance with a standard test adopted by the American Society for Testing Materials (ASTM), the octane number of a gasoline is determined by test in a standard engine maintained at prescribed test conditions.

Briefly, with the engine powered by the test gasoline, the engine compression ratio is varied by manual adjustment of an adjustable cylinder head until a standard detonation intensity is achieved, as determined by visual observation of a knockmeter. The knockmeter is coupled to a pickup located in the engine cylinder which generates signals representative of the magnitude of detonation in the cylinder. The signals from the pickup, which are generally erratic, are integrated to provide a relatively stable signal for application to the knockmeter. Following the application of the test gasoline to the engine, reference gasolines of known octane numbers are used to power the engine under the same conditions and the same compression ratio, and their knock intensities as registered by the knockmeter are noted. The octane number of the test gasoline is then determined by interpolation utilizing two reference gasolines whose knock intensities bracket that of the test gasoline.

While the foregoing test has been widely used for years, it leaves much to be desired. For one thing, test precision is poor, particularly because an accurate signal truly representative of the intensity of detonation is not generated, and because the knockmeter is subject to visual interpretation. Secondly, the test procedure is time consuming, typically involving a number of tests of the test and reference fuels before the test sample is actually bracketed by the reference fuels.

Because test precision is poor, it is a common refining practice, in order to maintain a specified octane number for a gasoline, to resort to the inefficient and costly expedient of setting blending conditions to produce a gasoline having an octane number that is between ⅓ and 1 octane number higher than that specified. Further, because the standard testing procedure is time consuming, it necessarily follows that relatively large amounts of fuel are needed to conduct a test. As a result, during the testing of gasoline produced by small experimental units, such as bench-type reformers and catalytic crackers, it may be necessary to run an experimental unit for as long as a week in order to obtain enough gasoline to conduct a single test. This can involve a costly delay in a project. Further, the results of the test reflect merely the average rather than the instantaneous quality of the gasoline produced by the experimental unit.

The present invention is directed toward the testing of a motor fuel wherein a test produces results more accurate than those obtainable under known testing procedures and in which the quantity of fuel needed to conduct the test is drastically reduced. To explain, in the testing of a gasoline, the fuel is applied in a combustible mixture to a test engine, and a highly accurate detonation detection circuit is employed to generate signals representative of detonation of the mixture. Concurrently, an engine condition is varied, such as the fuel-air ratio of the combustible mixture, while all other engine conditions are maintained constant. Typically, the variation in fuel-air ratio is such that detonation passes through maximum intensity. The detonation signal generated during each engine cycle is detected and stored, and the stored signals are operated upon to provide an output signal representative of maximum intensity detonation of the gasoline.

For example, a running average of the signals representative of detonation in each engine cycle may be computed, and the maximum value of the average may be taken as representative of maximum intensity detonation of the gasoline. Alternatively, curve fitting may be applied to the stored signals tabulated as a function of time to find the curve that best approximates the recorded data. The maximum value of the chosen curve then is taken to represent the maximum intensity detonation of the test fuel.

This procedure is repeated for a number of reference fuels of known octane numbers. The octane number of the test gasoline is computed by interpolation from the data derived from the reference fuels.

In the present invention, apparatus is provided for completing all the computations described above to determine automatically the maximum intensity detonation of each of the test and reference fuels and the octane number of the test fuel.

Because the detonation signal for each engine cycle is detected and stored and then operated upon, the test results are much more accurate than those produced during the standard test procedure wherein the signal is only roughly smoothed by integration and then applied to a knockmeter which must be visually observed and interpreted. Further, the statistical analysis of the stored detonation signals permits a test to be conducted using only a relatively small amount of test fuel. In particular, because an accurate representation of detonation is provided during each engine cycle, signals for only a relatively small number of engine cycles are needed to provide sufficient information to be operated upon to accurately determine the maximum intensity detonation of the test fuel.

The invention also includes a novel carburetor assembly which permits the testing of a plurality of fuels using only relatively small amounts of fuel. The fuels are contained in separate containers of small size connected to a selector valve which selectively couples one of the containers to a metering jet. The jet controls the amount of gasoline flowing therethrough, and is connected to the intake manifold of the test engine to supply a combustible fuel-air mixture to the engine. The valve is arranged to switch rapidly from one fuel container to another.

In practice, the engine is operated first upon a warmup fuel to maintain standard operating conditions, such as temperature and speed. When it is desired to run a test, the selector valve is switched from the warmup fuel to the fuel in one of the containers. The fuel drains out of the small container in which it is stored, and thus changes in level so as to vary the fuel-air ratio of the combustible mixture supplied to the engine. The change in fuel-air ratio is chosen so that maximum intensity detonation is produced in the engine at some time during the draining of the fuel from the container. The container, designed for the function of delivering a quantity of fuel to an engine over a range of fuel-air ratios which passes through maximum intensity detonation, is called a "falling-level carburetor."

After the container is drained, the selector valve is switched to another container, which is drained. This is repeated for all containers, after which the engine is switched back to the warmup fuel. By the rapid switching action of the selector valve, fuel is continuously supplied to the engine and the engine is not allowed to go through even one cycle without combustion occurring, thereby avoiding a cooling of the combustion chamber. Through the use of a selector valve leading to a single metering jet, rather than the plurality of jets each for a different fuel as provided by the standard ASTM test, the capacity of the fuel supply system may be greatly reduced in size. This provides a significant reduction in the amount of fuel needed to fill all fuel lines and chambers, and accordingly reduces the amount of fuel needed in a container to complete a test.

The containers may hold a plurality of reference fuels of known octane numbers and a plurality of test fuels whose octane numbers are to be determined. The reference fuels provide sufficient data to calibrate the engine and to determine the octane numbers of the test fuels.

Following is a detailed description of the invention, to be read in conjunction with the appended drawings, wherein.

*General description*

Figures 1, 2, 3:
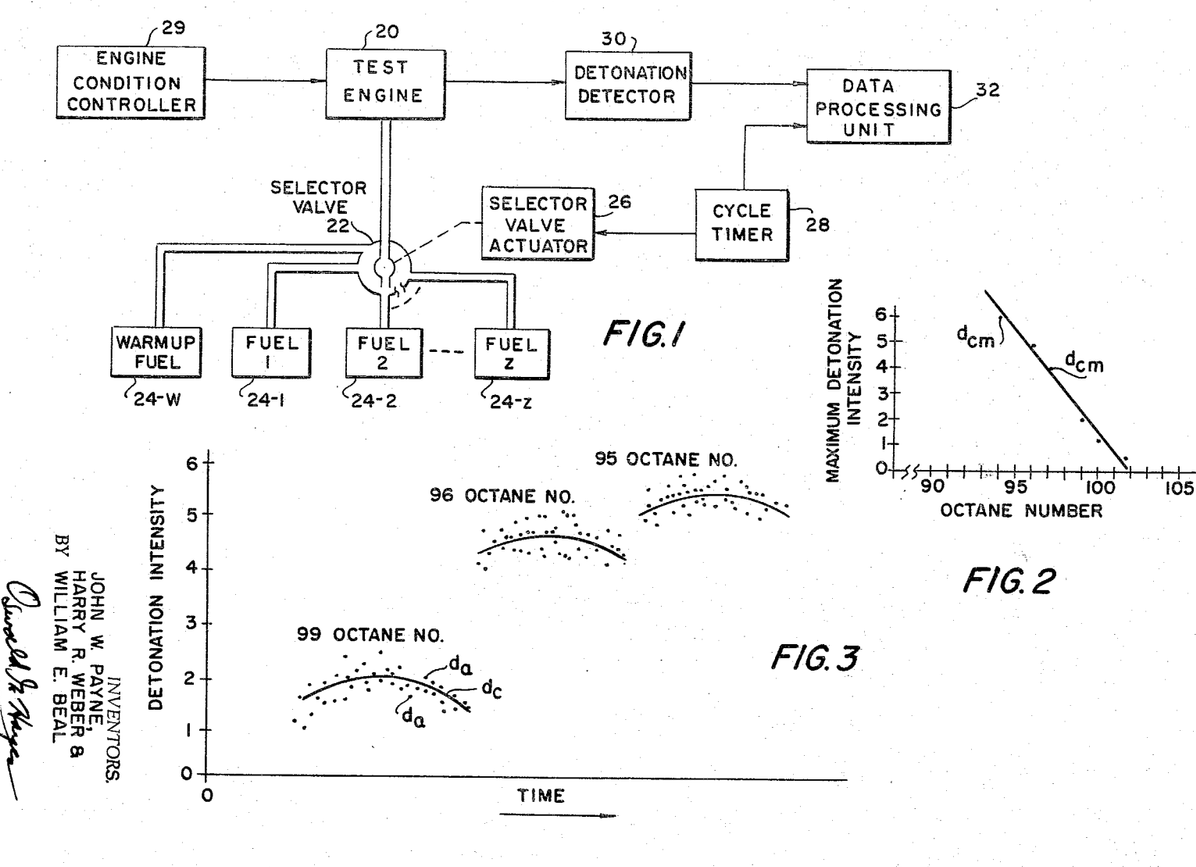
FIG. 1 is a block diagram of an illustrative system in accordance with the invention.
FIG. 2 is a typical waveform diagram showing maximum detonation intensity versus octane number for six fuels to provide a calibration curve for a test engine.
FIG. 3 is a typical waveform diagram showing detonation intensity versus time for three representative gasolines supplied sequentially to a test engine, wherein the fuel-air ratio of each gasoline is varied.

Referring to FIG. 1, a test engine 20, such as the standard ASTM-CFR engine commonly used for determining the octane numbers of gasolines, has fuel applied thereto from a selector valve 22. The selector valve is, in turn, coupled to a plurality of fuel sources 24-w, 24-1, 24-2 ... 24-z, each of which contains a different fuel. For example, the fuel in the source 24-w may be a warmup fuel used to establish the engine 20 at proper operating conditions, such as a fixed engine speed and temperature at a fixed compression ratio in the engine. The fuels 1, 2 ... z in the sources, 24-1, 24-2 ... 24-z, respectively, may include a number of reference fuels of known octane numbers and a number of test fuels whose octane numbers are to be determined. The selector valve 22 is driven by a selector valve actuator 26 under the control of a cycle timer 28 to selectively couple the fuel sources to the test engine 20. Typically, the valve 22 is actuated so that the fuels 1, 2 ... z are sequentially applied to the test engine after the engine is established and fixed at its operating conditions with the warmup fuel from the source 24-w.

During the application of each of the fuels 1, 2 ... z to the engine 20, an operating condition in the engine, such as the fuel-air ratio of the combustible mixture applied to the engine, is varied by an engine condition controller 29, while the other operating conditions, such as engine speed and compression ratio, remain unchanged. Typically, the controller varies the fuel-air ratio for each of the fuels 1, 2 ... z so that detonation of the combustible mixture passes through maximum intensity detonation.

FIG. 3 is a waveform diagram showing the typical variation of detonation intensity with time as effected by the engine condition controller 29 for three fuels sequentially applied to the engine 20. The detonation for each engine cycle is indicated by a corresponding point on the waveform diagram of FIG. 2. An average detonation intensity is represented by each of the solid lines in the figure fitted to the individual points. The first fuel is of an octane number equal to 99, and the maximum detonation intensity varies roughly about the magnitude 2 on the detonation intensity scale shown in the figure. It will be noted that the intensity first increases to a peak magnitude and then decreases thereafter. This is accomplished by the engine condition controller 29 by varying the fuel-air ratio of the combustible mixture from a relatively rich value to a relatively lean value passing through the ratio corresponding to maximum detonation intensity.

The second fuel applied to the engine is of an octane number equal to 96, and as will be noted the maximum detonation intensity varies, roughly, about the magnitude 4.5. The third fuel applied to the engine is of an octane number of 95, and the maximum detonation intensity varies, roughly, about the magnitude 5.5.

Referring again to FIG. 1, detonation in the test engine 20 is detected by a detonation detector 30, which may be of the type shown in any of FIGS. 2, 3 and 4 of the co-pending application Ser. No. 160,051, filed in the name of William E. Beal on Dec. 18, 1961, for Apparatus for Determining the Combustion Quality of a Fuel, now Patent No. 3,238,765, and assigned to the assignee of the present application. The detonation detector 30 generates accurate signals representative of detonation of the combustible mixture in the test engine during each engine cycle. These signals may be representative of the magnitude of detonation, or they may be representative of the difference in time between the occurrence of detonation and a predetermined reference time in each engine cycle. In the description that follows, it will be considered that the signals from the detonation detector are representative of the intensity of detonation, although this is merely representative.

The signals from the detonation detector 30 are applied to a data processing unit 32, which also receives signals from the cycle timer 28. The data processing unit analyzes the signals from the detonation detector for each of the fuels 1, 2 ... z. First, the maximum intensity detonation of each of the fuels applied to the engine is determined. Next, the octane numbers of the test fuels are computed from the maximum intensity detonation information, as well as from information regarding the known octane numbers of the reference fuels included among the fuels 1, 2 ... z.

FIG. 2 is a typical waveform diagram showing maximum detonation intensity versus octane number for the reference fuels of known octane number that are applied to the test engine 20. The points in the figure represent the actual values of maximum detonation intensity, determined by the data processing unit 32, and are plotted against the known octane numbers of the reference fuels. The solid line in the figure indicates an average computed from the data. This curve is known as a calibration curve for the engine, and is computed by the data processing unit 32. For each of the test fuels of unknown octane number, the octane number of the fuel is determined by employing the curve and selecting the point thereon corresponding to the maximum detonation intensity determined for the fuel. This is also accomplished automatically by the data processing unit 32.

Carburetion and fuel selection

Figure 4:
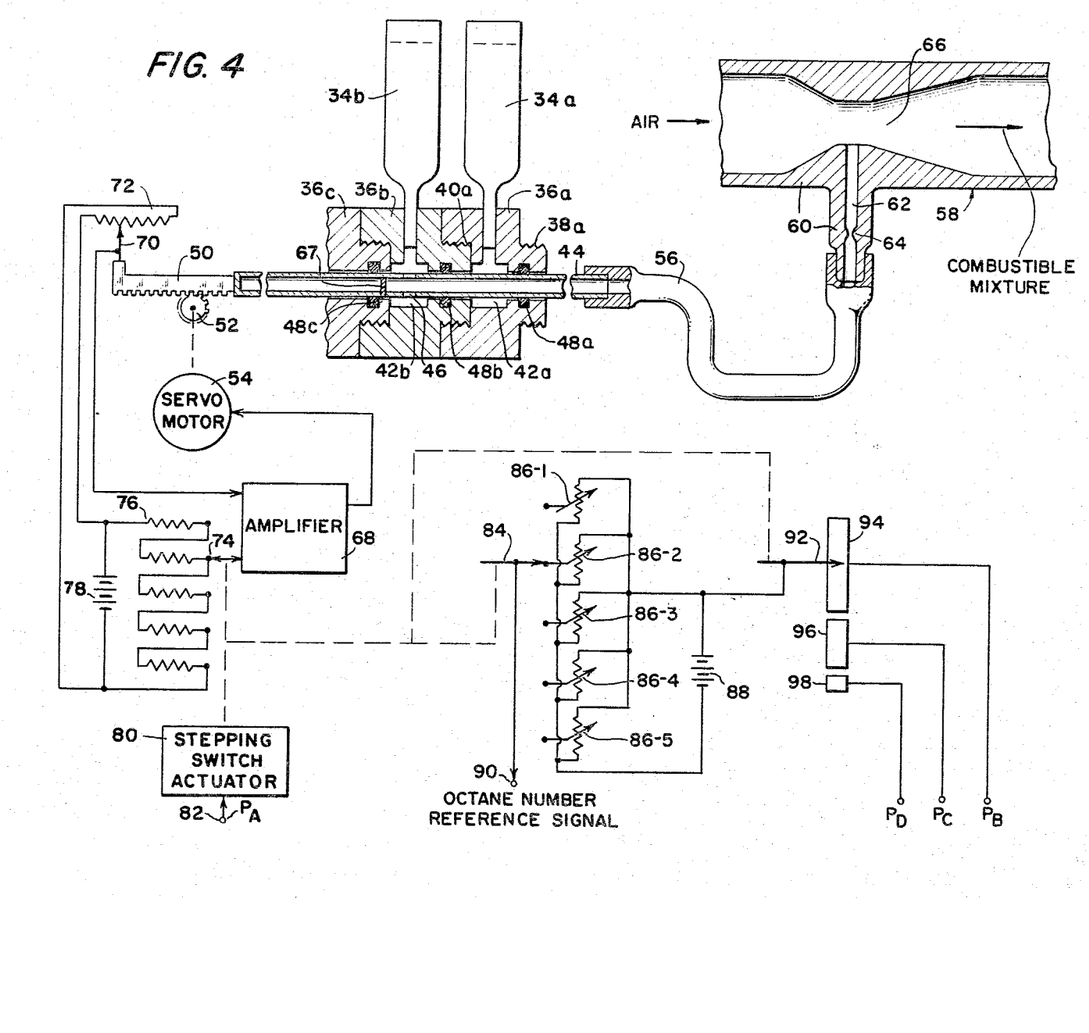
FIG. 4 is a diagram of a typical carburetor, fuel selection, and signal generating system in accordance with the invention.

FIG. 4 shows a carburetor and fuel selector arrangement for the test engine 20, instrumenting the fuel selector valve 22, as well as the engine condition controller 29 of FIG. 1. Two containers 34a and 34b are shown, each of which contains either a reference fuel of known octane number or a test fuel whose octane number is to be determined. The arrangement is such, however, that any number of containers may be employed, one of which may be coupled to a source of bulk warmup fuel.

The containers 34a and 34b are open at the top or otherwise formed to communicate with the atmosphere to allow fluid therein to be readily withdrawn therefrom at the bottom. The containers 34a and 34b are also typically of small size—say, of 10 millimeters capacity—to accommodate small samples of fuel, and are connected to housings 36a and 36b. The housing 36a is representative, and is formed with a male threaded end 38a and a female threaded end 40a. This permits a housing to be coupled to two adjacent housings, as is the housing 36b coupled to the housings 36a and 36c.

The housings 36a and 36b are formed with passageways 42a and 42b therethrough in which a tube 44 is positioned. The tube has an opening 46 formed therein so that fuel in the chamber surrounding the opening may flow into the tube. O-rings 48a, 48b, and 48c are included to prevent leakage of gasoline from the chambers.

The tube 44 is connected to a rack 50 driven by a gear 52 which is actuated by a servomotor 54. Under the action of the servomotor, the tube 44 is driven so that the opening 46 in the tube is positioned in one of the chambers 42a and 42b.

One end of the tube 44 is opened and is coupled to a flexible tube 56 connected to a venturi 58. The venturi is formed from a housing 60 having a fuel passage 62 and a venturi passage or nozzle 66 therein. A metering jet 64 is positioned within the fuel passage 62 to meter the fuel flowing through the passage 62 and into the neck of the venturi passage 66. Air flowing as shown by the arrow in FIG. 4 passes through the venturi passage 66 and draws gasoline from the fuel passage 62 into the venturi passage 66, where it is mixed with the air to form a combustible mixture which is applied to the intake manifold (not shown) of the test engine 20.

In the position of the tube 44 shown in FIG. 4, gasoline from the container 34b is applied to the venturi 58. Fuel drains out of the container and, in so doing, the pressure of the gasoline applied to the venturi decreases. This changes the fuel-air ratio of the combustible mixture formed in the venturi passage 66. By proper selection of the height of the container above the level of the venturi passage 66, the change may be made to encompass the ratio that produces maximum intensity detonation in the test engine.

The small size of the containers 34 and associated tubing, as well as the use of a single metering jet 64, permits the capacity of the fuel supply system to be considerably reduced. In this fashion, the fuel necessary to fill all portions of the assembly to conduct a test is correspondingly reduced, thus permitting small amounts of fuel to suffice for testing. In this regard, the tube 44 may be blocked by a partition 67 adjacent to the opening 46 so that gasoline does not have to fill the tube any more than necessary. Only the portion of the tube between the opening 46 and the flexible tube 56 is then filled with gasoline.

The servomotor 54 that drives the gear 52 to position the tube 44 is controlled by signals received from an amplifier 68 having one input connected to movable contact 70 of a potentiometer 72. The movable contact 70 is connected to the rack 50, and its position is determined by the position of the rack. The other input to the amplifier is connected to movable contact 74 of a stepping switch 76. The potentiometer 72 and the stepping switch 76 are both coupled across a battery 78.

The stepping switch contact 74 is driven by a stepping switch actuator 80 which is periodically energized by pulses $P_A$ applied to an input terminal 82. In response to an input pulse $P_A$, the stepping switch actuator moves the stepping switch contact 74 to change the potential at the contact that is applied to the amplifier 68. Any difference between this potential and the potential developed by the potentiometer contact 70 produces a signal from the amplifier which energizes the servomotor 54 to change the position of the rack 50 until the potentials developed at the contacts 70 and 74 are equal. Suitable calibration of the potentiometer 72 and the stepping switch 76 ensures that the different positions of the stepping switch correspond to the positions of the tube opening 46 in the different chambers 42.

Data processing

In the description that follows, various systems will be explained for computing the maximum intensity of detonation for each of the fuels applied to the test engine 20, as well as the octane numbers of test fuels from the maximum intensities of the test fuels and reference fuels of known octane numbers.

Reference signals

Signals representative of the known octane numbers of the reference fuels applied to the test engine 20 are employed in the data processing systems to be described. Such signals may be generated by a movable contact 84 driven by the stepping switch actuator 80 and selectively connected to one of five potentiometers 86–1, 86–2, 86–3, 86–4 and 86–5. The number of potentiometers chosen is simply for illustration only. The potentiometers are energized by a battery 88 and generate different potentials depending upon their settings. By virtue of the coupling between the stepping switch actuator 80 and the contact 84, the contact 84 is thus positioned in accordance with the fuel selected for application to the test engine, and the signal generated by the associated potentiometer may be made representative of the octane number of that fuel when it is a reference fuel. This signal appears at an output terminal 90.

Timing pulses

Four timing pulses, $P_A$, $P_B$, $P_C$, $P_D$, are employed in the data processing systems to be described. The pulse $P_A$ is a periodic pulse which is generated by the cycle timer 28 to FIG. 1 to change the fuel applied to the test engine 20. As shown in FIG. 4, the pulse $P_A$ is applied to the stepping switch actuator 80 to accomplish this. The time elapsing between successive pulses $P_A$ should be roughly equal to the time taken for the fuel in one of the containers 34 to drain from the container. In this fashion, during the testing of a plurality of fuels, the fuel is allowed to drain almost completely from the container before the tube opening 46 is switched to another container. In this regard, the engine should always be supplied with fuel to prevent cooling of the combustion chamber.

The pulse $P_B$ is generated during the period that one or more reference fuels are applied to the test engine 20. The pulse $P_C$ is generated during the time that one or more test fuels are applied to the test engine. The pulse $P_D$ is generated at the end of a complete test sequence of reference and test fuels.

The pulses $P_B$, $P_C$, and $P_D$ may be generated by an arrangement as shown in FIG. 4 comprising a switch contact 92 driven by the stepping switch actuator 80. The contact 92 is energized by the battery 88 and applies power to one of segments 94, 96, and 98, depending upon the position of the contact. By appropriate selection of the lengths of the contacts 94, 96, and 98, output pulses $P_B$, $P_C$, and $P_D$ may be developed corresponding to the position of the switch contact 92 and, hence, the type of fuel applied to the engine. As shown in FIG. 4, which is merely representative, when the contact 92 is connected to the terminal 94, the pulse $P_B$ is generated. When the contact 92 is connected to the terminal 96, the pulse $P_C$ is generated. And finally, at the end of the sequence, when the contact 92 is connected to the terminal 98, the pulse $P_D$ is generated.

Determination of maximum intensity detonation

For each of the fuels applied to the engine 20, the signals generated by the detonation detector 30 of FIG. 1, plotted as a function of time, assume a waveform such as any one of the three waveforms in FIG. 3. Inasmuch as the individual points in the figure representative of detonation intensity for each engine cycle do not exactly define a smooth curve, it is necessary to determine the curve that best approximates the individual points, and then to select the point on the curve corresponding to maximum intensity detonation. In accordance with the present invention, this may be done by two computational methods, although certainly other methods may also be employed in accordance with the invention. The two methods employed by way of example are (a) computing a running average and detecting its maximum value, and (b) fitting a curve to the experimental data by the method of least squares and determining the maximum value of the curve. These are treated separately below.

Computation theory—running average

A running average of a plurality of points plotted as a function of time is defined as the average value of a predetermined number of previous points, computed for all of the points. This may be expressed mathematically by the following equation:

$$D = \frac{1}{n}(d_i + d_{i-1} + d_{i-2} + \ldots d_{i-h+1}) \quad (1)$$

where $d_i$ is the value of the $i$th point, $h$ is the number of points from which the average is computed, and $D$ is the running average computed at the $i$th point.

To give an example, in FIG. 2 a running average is computed for the points plotted for the 99 octane number fuel as follows. Assume that the number of points average ($h$) is 5. Then for every point ($d_a$), the detonation intensity of that point and the intensities of the four previously occurring points are summed and divided by 5 to compute the running average for that point. The running average is plotted against time to give the curve ($d_c$) shown in the figure.

Computing circuitry—running average

Figure 5:
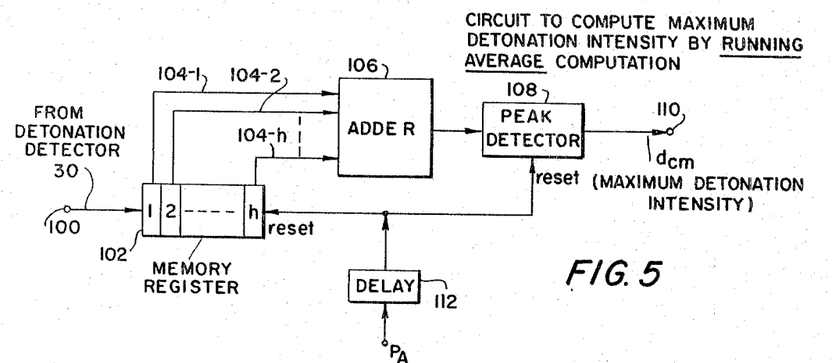
FIG. 5 is a block diagram of a system in accordance with the invention for determining the maximum detonation intensity of a fuel in an engine from detonation data recorded during each engine cycle and in an engine employing a running average computation.

The circuit of FIG. 5 computes a running average of the detonation signal generated by the detonation detector 30 of FIG. 1 and determines the maximum value of the running average, corresponding to the maximum value of the curve $d_c$ in FIG. 2 for the 99 octane number fuel, for example.

FIG. 5 shows that signals from the detonation detector 30 are applied to an input terminal 100 connected to a memory register 102. The memory register may be similar to a shifting type register having 1, 2 . . . $h$ stages, each of which is coupled by an associated conductor 104–1, 104–2 . . . 104–$h$ to an adder 106. The adder 106 is connected to a peak detector 108 which generates an output signal at an output terminal 110.

The signals from the detonation detector 30, representing the intensity of detonation during each engine cycle, are stored in the memory register 102. Inasmuch as the register contains only $h$ stages, at any time only the last $h$ signals are stored. This means that, when the register stages are completely filled with signals, as a new signal is received the signals stored in the register are shifted from one stage to another so that the new signal applied to the register is stored therein and the oldest signal stored is dropped from the register.

The signals on the conductors 104–1, 104–2 . . . 104–$h$ when summed in the adder 106 are thus representative of the sum in parentheses in Equation 1 above. The peak detector 108 detects the peak or maximum value of the signal from the adder 106, which is accordingly representative of the maximum value of the running average indicated in Equation 1. This corresponds to the maximum value of the curve $d_c$ in FIG. 2, for example. In this regard, it should be noted that since the divisor $h$ in Equation 1 is constant, no provision is made for the division in the circuit of FIG. 5, inasmuch as the output signal appearing at the terminal 110 may be scaled accordingly for proper calibration to reflect the division.

The memory register 102 and the peak detector are both reset by pulses $P_A$ from the circuit of FIG. 4 applied through a delay 112. As described above, these pulses occur periodically to switch the test engine 20 from one fuel to another. Thus, each time a new fuel is applied to the engine, the memory register and peak detector are reset and are made ready for another computation.

Computation theory—least squares approximation

As explained above, an alternate computational procedure for computing the curve that best approximates the detonation signals generated by the detonation detector 30, plotted as a function of time, is by a least squares approximation. In this technique, a curve is chosen such that the square of the difference between each experimentally determined point and the corresponding point on the curve, summed for all points, is minimized. Stated mathematically, a curve is chosen such that the sum $$\sum_{i=1}^{j}(d_c - d_a)_i^2 \quad (2)$$

is minimized. In expression (2), and with regard to the waveforms of FIG. 2, $d_a$ represents the detonation intensity detected by the detonation detector 30 for a given engine cycle, $d_c$ represents the detonation intensity as determined from the solid curve which approximates the experimental data, $j$ represents the number of individual points constituting the experimental data, and $i$ represents the $i$th point.

It is assumed that a parabola best approximates the experimental data shown in FIG. 2. The equation for a parabola is given by:

$$d_c = qt^2 + rt + s \quad (3)$$

where $d_c$ is as defined above in expression (2), $t$ represents time, and $q$, $r$, and $s$ are constants.

In the method of least squares approximation, then, the values of $q$, $r$, and $s$ for Equation 3 are chosen so that the sum indicated in expression (2) is minimized. To determine the values of $q$, $r$, and $s$ that minimize expression (2) and identify the parabola that best approximates the experimental data, it is convenient to rewrite Equation 3 by solving:

$$d_c - \bar{t} = Q(t - \bar{t})^2 + R(t - \bar{t}) + S \quad (3a)$$

for $d_c$ and equating the coefficients of powers of $t$ with the corresponding coefficients of Equation 3. Equation 3 as thus rewritten has the form:

$$d_c = Qt^2 + (R - 2Q\bar{t})t + (\bar{d} + Q\bar{t}^2 - R\bar{t} + S) \quad (4)$$

wherein:

$$\bar{t} = \frac{1}{j}\sum_{i=1}^{j}(t_a)_i \quad (5)$$

$$\bar{d}=\frac{1}{j}\sum_{i=1}^{j}(d_a)_i \qquad (6)$$

$$q=Q \qquad (7)$$

$$r=R-2Q\bar{t} \qquad (8)$$

$$s=\bar{d}+Q\bar{t}^2-R\bar{t}+S \qquad (9)$$

In terms of the waveform shown in FIG. 2, $\bar{t}$ given by expression (5) is the mean time for all the experimentally determined points, the time of each point being $t_a$. In expression (6), $\bar{d}$ is the average value of all the experimentally determined detonation intensities $d_a$. Expressions (7), (8), and (9) relate the factors Q, R, and S of Equation 4 to the factors q, r, and s of Equation 3.

To find the maximum value of the parabola of Equation 4, the equation is differentiated with respect to time and the derivative is set equal to zero. This produces the following equation:

$$0=2Qt+R-2Q\bar{t} \qquad (10)$$

The value of $t$ at the maximum point, expressed as $t_m$, is given by the following equation, which is derived by solving Equation 10 for $t$:

$$t_m=\frac{2Q\bar{t}-R}{2Q} \qquad (11)$$

Substituting the value of $t_m$ from Equation 11 into Equation 4 and solving for $d_c$, the maximum intensity detonation $d_{cm}$ is given by the following equation:

$$d_{cm}=\bar{d}-\frac{R^2}{4Q}+S \qquad (12)$$

It may be shown that the coefficients Q, R, and S of Equation 12 which, when applied in Equation 4, minimize expression (2) are as follows:

$$Q=\frac{-j\sum_{i=1}^{j}(d_a-\bar{d})_i(t_a-\bar{t})_i^2}{\left[\sum_{i=1}^{j}(t_a-\bar{t})_i^2\right]^2-j\sum_{i=1}^{j}(t_a-\bar{t})_i^4} \qquad (13)$$

$$R=\frac{\sum_{i=1}^{j}(d_a-\bar{d})_i(t_a-\bar{t})_i}{\sum_{i=1}^{j}(t_a-\bar{t})_i^2} \qquad (14)$$

$$S=\frac{\left[\sum_{i=1}^{j}(t_a-\bar{t})_i^2\right]\left[\sum_{i=1}^{j}(d_a-\bar{d})_i(t_a-\bar{t})_i^2\right]}{\left[\sum_{i=1}^{j}(t_a-\bar{t})_i^2\right]^2-j\sum_{i=1}^{j}(t_a-\bar{t})_i^4} \qquad (15)$$

*Computing circuitry—least squares approximation*

The circuits shown in FIGS. 6 through 11 carry out the computations indicated in Equations 12 through 15 above to determine the maximum value of the parabola that best approximates the points representing the detected detonation intensities for the fuel applied to the test engine 20.

Figure 6:
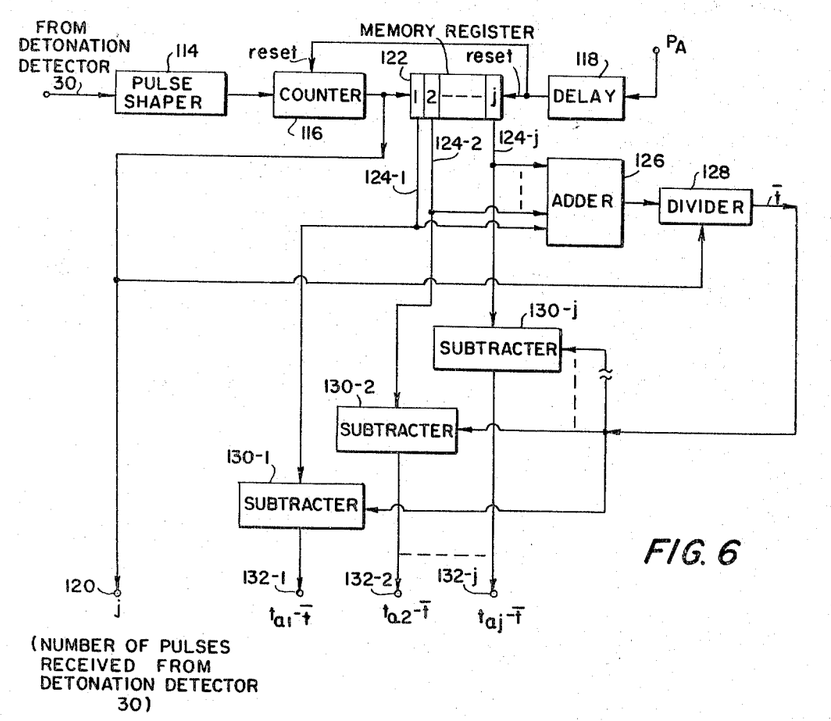
FIGS. 6 through 11 are block diagrams of a system in accordance with the invention to determine the maximum detonation intensity of a fuel in an engine from detonation data recorded during each engine cycle and employing a least squares computation.

FIG. 6 shows that signals from the detonation detector 30 of FIG. 1 are applied to a pulse shaper 114 which shapes the pulses to a uniform size and applies them to a counter 116. The counter 116 is reset by the pulses $P_A$ from the circuit of FIG. 4 after a slight delay provided by delay unit 118. Thus, the counter is reset just shortly after each new fuel is applied to the test engine 20.

The counter 116 counts the pulses from the pulse shaper 114 and generates an output signal applied to an output terminal 120 representative of the pulses counted. At the end of a test of a fuel in which the test engine 20 has gone through $j$ cycles, $j$ detonation pulses are counted by the counter and the signal at the terminal 120 is representative of this number.

The counter 116 is also coupled to a memory register 122 which has stages 1, 2 . . . $j$ therein to store the individual signals from the counter. The signals in the stages of the register are each representative of the co-ordinate along the time axis in FIG. 2, for example, of the corresponding point $d_a$ representing the detonation intensity in that engine cycle. Inasmuch as the ASTM testing procedure prescribes a contant engine speed, the points $d_a$ are all equally spaced in time, and the relative times of the pulses may be determined by counting detonation pulses in the counter 116.

It should be noted, however, that time need not be the coordinate against which detonation intensity is plotted, as it is in FIG. 2. What is needed is an indication of the relative order of the detonation pulses so that a waveform diagram like that of FIG. 2 may be developed. That is, the horizontal coordinate in the figure need not be time, but may represent the order of the engine cycle. The counter 116, as explained above, provides an output signal representative of such order.

The stages 1, 2 . . . $j$ of the register are coupled by conductors 124–1, 124–2 . . . 124–$j$ to an adder 126 wherein the signals in the register stages are summed. The output signal from the adder 126 is applied to a divider 128 which also receives a signal from the counter 116 representative of the factor $j$. The output signal from the divider 128 is thus representative of $\bar{t}$ as given in Equation 5, i.e., the mean time of all the experimentally determined points $d_a$ as plotted in FIG. 2.

The output from the divider 128 is applied to subtractors 130–1, 130–2 . . . 130–$j$ which receive signals from the conductors 124–1, 124–2 . . . 124–$j$, respectively. The subtracters are coupled to output terminals 132–1, 132–2 . . . 132–$j$ to generate output signals representative of the time of each experimentally determined detonation signal minus the time $\bar{t}$.

Figure 7:
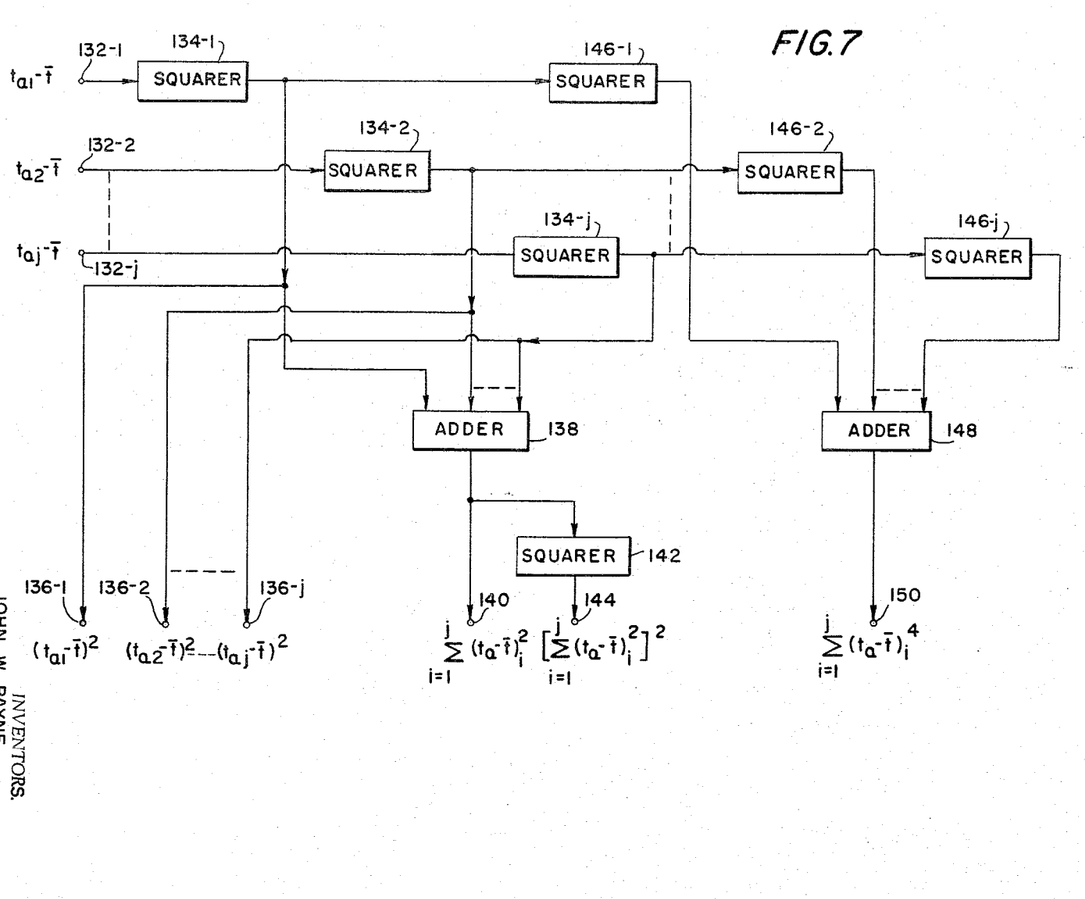

Referring to FIG. 7 the output terminals 132–1, 132–2 . . . 132–$j$ are coupled to squarers 134–1, 134–2 . . . 134–$j$, respectively. Output signals from the squarers 134 appear at output terminals 136–1, 136–2 . . . 136–$j$, and represent the squares of the signals appearing at the output terminals 132 of FIG. 6. The signals from the squarers 134 are also applied to an adder 138, whose output signal appears at an output terminal 140 and is representative of the following expression:

$$\sum_{i=1}^{j}(t_a-\bar{t})_i^2 \qquad (16)$$

The signal from the adder 138 is also applied to a squarer 142 to generate an output signal at a terminal 144 representative of the square of the signal at the output terminal 140. This signal is represented by the following expression:

$$\left[\sum_{i=1}^{j}(t_a-\bar{t})_i^2\right]^2 \qquad (17)$$

The squarers 134–1, 134–2 . . . 134–$j$ are connected to squarers 146–1, 146–2 . . . 146–$j$, respectively, which square the signals applied thereto and apply the squared signals to an adder 148. The output signal from the adder 148 is coupled to an output terminal 150 which generates an output signal representative of the following expression:

$$\sum_{i=1}^{j}(t_a-\bar{t})_i^4 \qquad (18)$$

It should be noted that if $j$ as used in Equations 2 through 18 above is constant, then the expression $\bar{t}$ of 5 above is constant, and all the signals developed by the circuits of FIGS. 6 and 7 are likewise constant. This means that the circuits of FIGS. 6 and 7 may be replaced by signal generators which generate constant signals. Such signal generators may consist of suitable sources of potential, for example.

Figure 8:
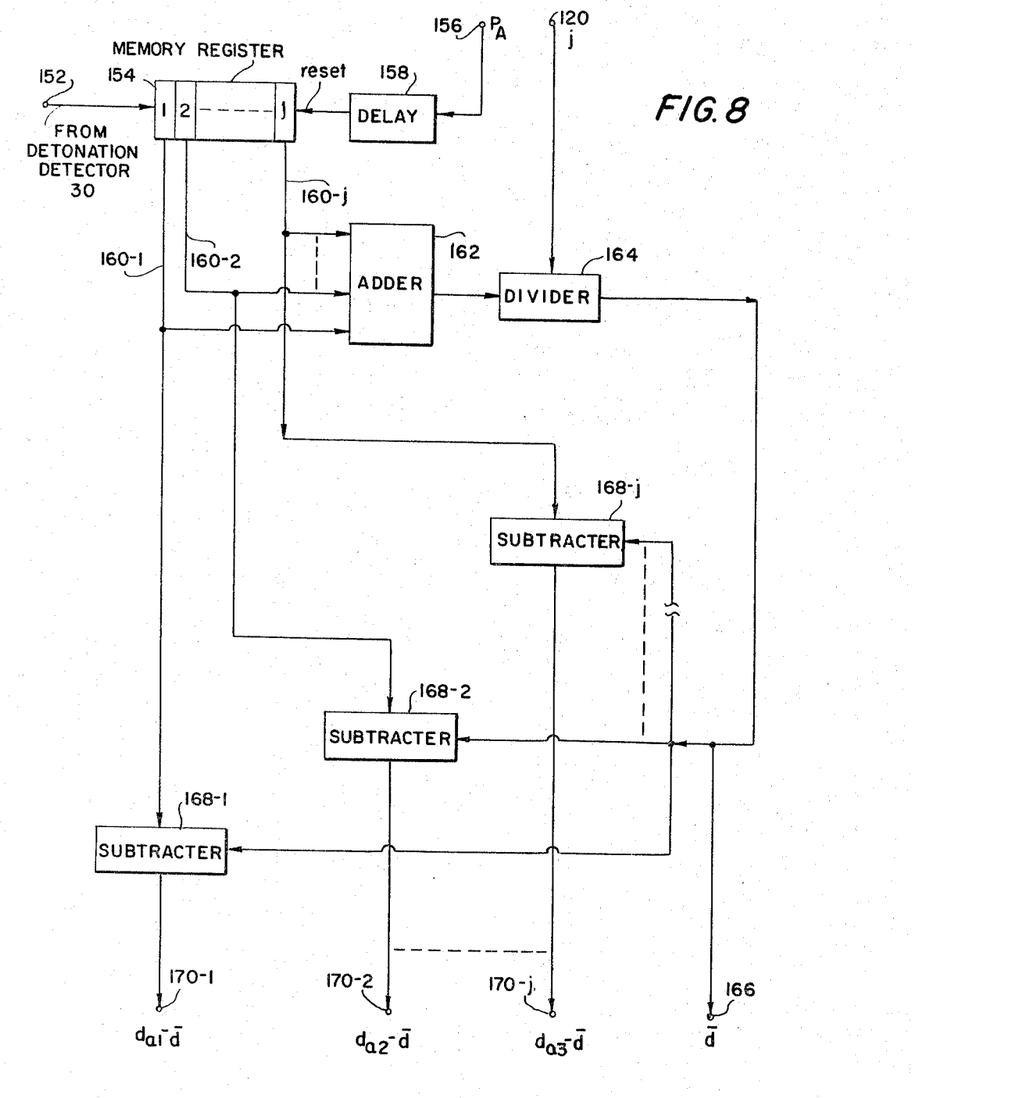

Referring to FIG. 8, signals from the detonation detector 30 of FIG. 1 are applied to an input terminal 152 which is coupled to a memory register 154. The register has stages 1, 2 . . . j therein which store the signals from the detonation detector representative of the intensity of detonation during each cycle involving the test of a given fuel. The register 154 is reset by the pulses $P_A$ applied to a terminal 156 and coupled to the register through a delay 158. Thus, the register is reset just after a new fuel is applied to the test engine.

The stages 1, 2 . . . j of the register 154 are coupled by conductors 160-1, 160-2 . . . 160-j to an adder 162 which generates an output signal representative of the sum of all the detonation intensities detected. This signal is applied to a divider 164 which receives a signal from the terminal 120 of FIG. 6 representative of the factor j. The output signal from the divider 164 is coupled directly to an output terminal 166 and is representative of $\bar{d}$ as given in expression (6) above, i.e., the average value of the detonation intensities.

The output signal from the divider 164 is also applied to subtracters 168-1, 168-2 . . . 168-j which receive signals respectively from conductors 160-1, 160-2 . . . 160-j from the memory register 154. Output signals from the subtracters 168 appear at output terminals 170-1, 170-2 . . . 170-j and represent for each of the points plotted in one of the waveforms of FIG. 2 the difference between the detonation intensity of that point and the average detonation intensity $\bar{d}$ for all the points.

Figure 9A:
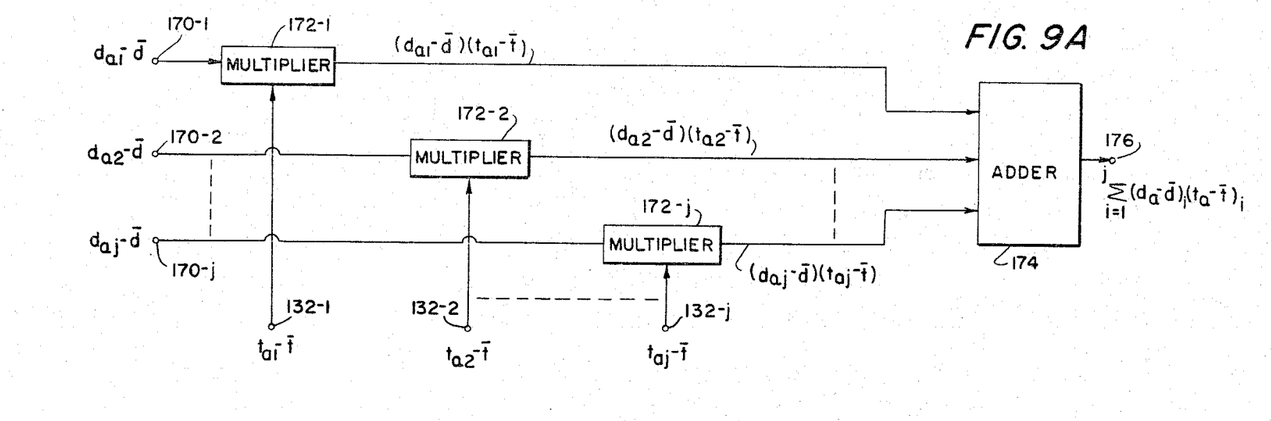

FIG. 9A shows that the output terminals 170-1, 170-2 . . . 170-j from the circuit of FIG. 8 are coupled to multipliers 172-1, 172-2 . . . 172-j. The multipliers 172 also receive signals from the output terminals 132-1, 132-2 . . . 132-j from the circuit of FIG. 6. The signals from the multipliers 172 are applied to an adder 174 which generates an output signal at an output terminal 176 which is representative of the expression:

$$\sum_{i=1}^{j}(d_a-\bar{d})_i(t_a-\bar{t})_i \quad (19)$$

It will be noted that the signal generated at the output terminal 176 is representative of the numerator of Equation 14 above.

Figure 9B:
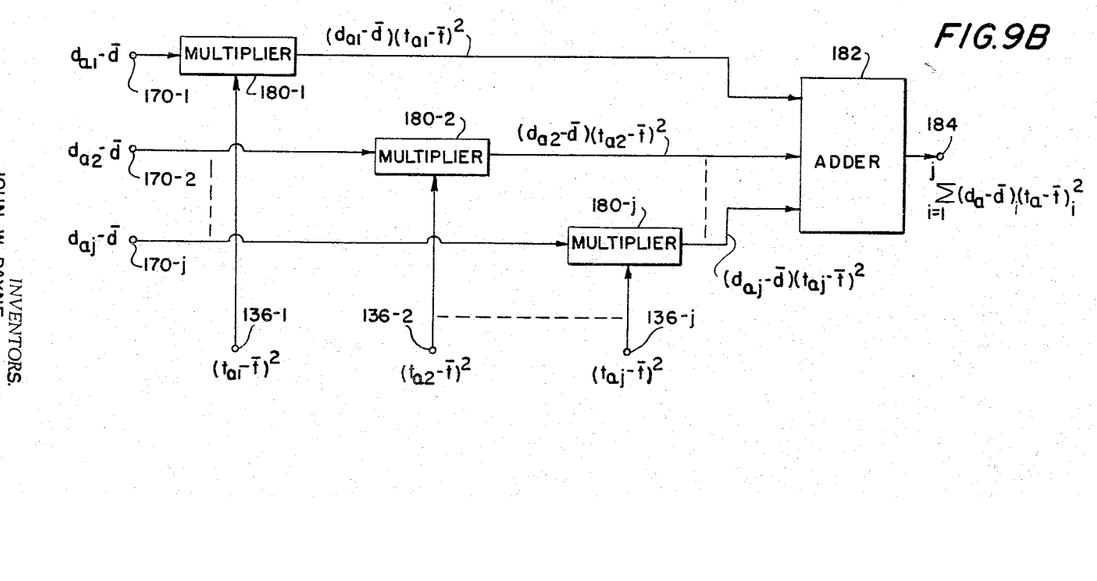

FIG. 9B shows that the output terminals 170-1, 170-2 . . . 170-j from the circuit of FIG. 8 are coupled respectively to multipliers 180-1, 180-2 . . . 180-j. The multipliers 180 also receive signals from the output terminals 136-1, 136-2 . . . 136-j from the circuit of FIG. 7. The output signals from the multipliers 180 are applied to an adder 182 which generates at an output terminal 184 a signal representative of the expression:

$$\sum_{i=1}^{j}(d_a-\bar{d})_i(t_a-\bar{t})_i^2 \quad (20)$$

It will be noted that the signal at the output terminal 184 is representative of the expression in the right hand bracket of the numerator in Equation 15 above.

Figure 10:
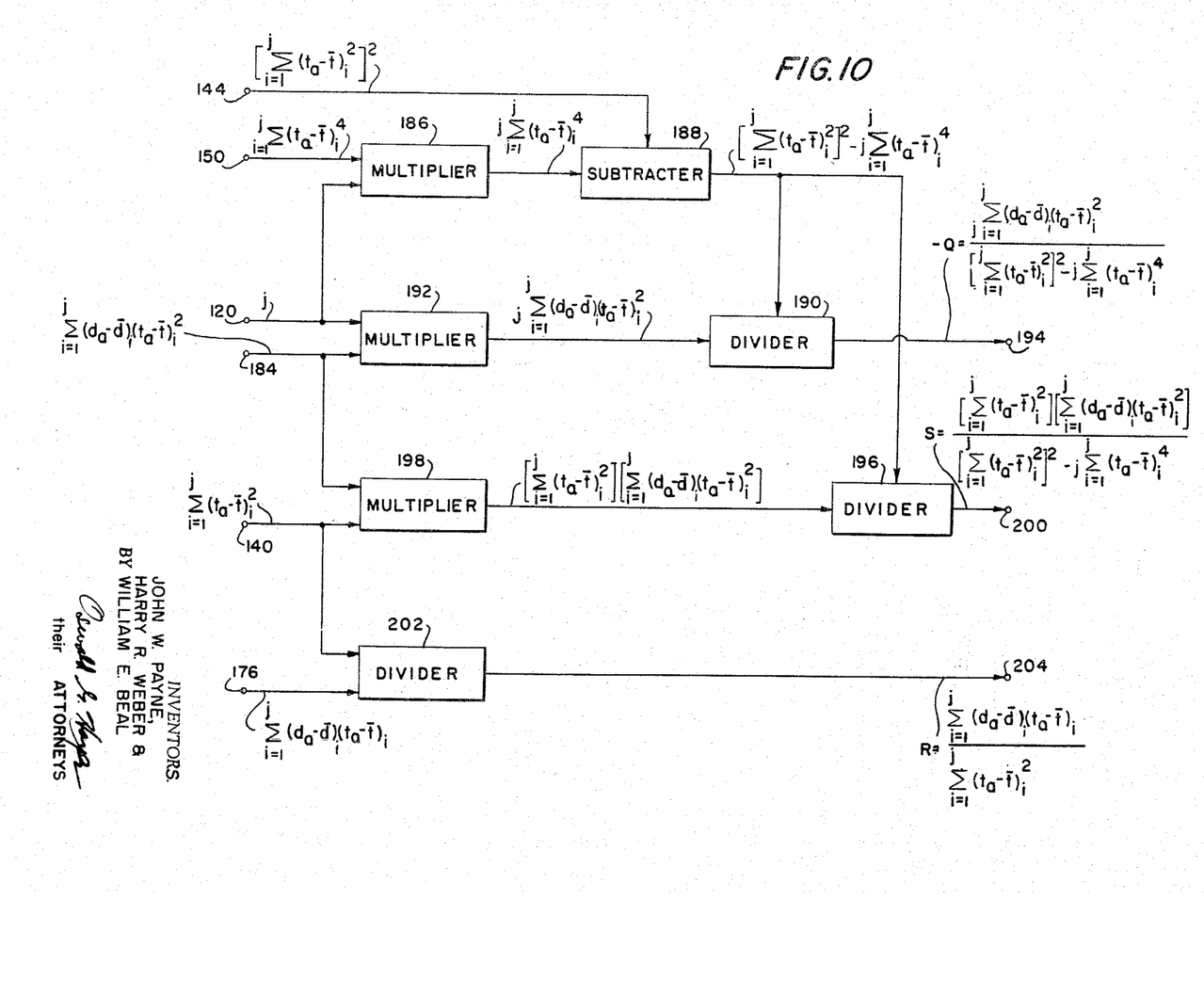

The circuit shown in FIG. 10 utilizes the signals generated by the circuits of FIGS. 6, 7, 9A, and 9B to generate output signals representative of Q, R, and S as given in Equations 13, 14, and 15 above.

Referring to FIG. 10, the signal from the output terminal 150 in the circuit of FIG. 7 is applied to a multiplier 186 which also receives a signal from the output terminal 120 of the circuit of FIG. 6. The output signal from the multiplier 186 is applied to a subtracter 188 which also receives an input signal from the output terminal 144 of the circuit of FIG. 7. The signal from the subtracter 188 is applied to a divider 190 which receives an input signal from a multiplier 192. The multiplier 192 receives its input signals from terminals 120 and 184 of the circuits of FIGS. 6 and 9B, respectively. The output signal from the divider 190 is applied to an output terminal 194 and is representative of −Q as given in Equation 13 above.

The signal from the subtracter 188 is also applied to another divider 196 which receives an input signal from a multiplier 198. The multiplier 198 receives input signals from the terminals 184 and 140 from the circuits of FIGS. 9B and 7, respectively. The output signal from the divider 196 is applied to an output terminal 200 and is representative of A as given in Equation 15 above.

The signals from the output terminals 140 and 176 of the circuits of FIGS. 7 and 9A, respectively, are applied to a divider 202 which generates an output signal appearing at an output terminal 204 representative of R in Equation 14 above.

Figure 11:
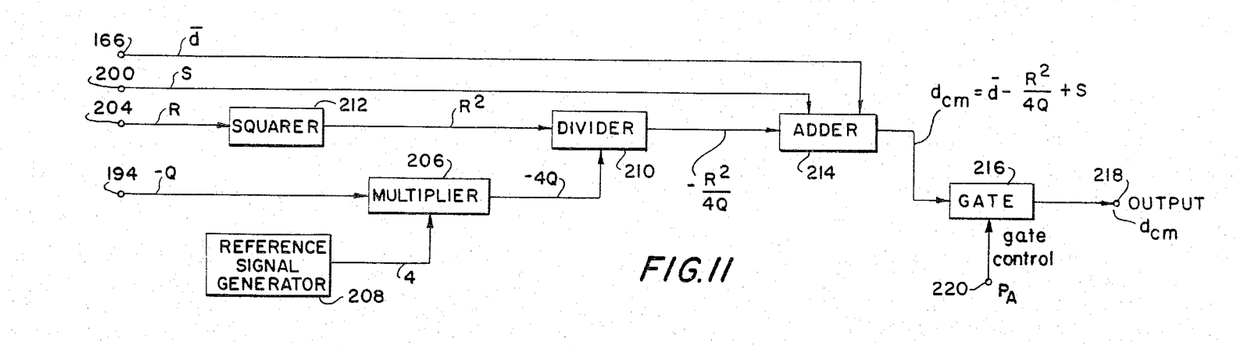

The circuit of FIG. 11 combines the output signals from the circuits of FIGS. 8 and 10 to carry out the computations of Equation 12 above to generate an output signal representative of the maximum detonation intensity for the fuel applied to the test engine.

FIG. 11 shows that the output terminal 194 from the circuit of FIG. 10 is coupled to a multiplier 206 which receives another signal from a reference signal generator 208. The reference signal generator 208 may comprise a source of potential, such as a battery, to generate a signal representative of the multiplication factor 4. The output signal from the multiplier 206 is thus representative of −4Q, and this signal is applied to a divider 210. The divider 210 receives another input signal from a squarer 212 which, in turn, receives signals from the output terminal 204 of the circuit of FIG. 10 representative of R. The signal from the squarer 212 is representative of $R^2$, and thus the signal from the divider 210 is representative of:

$$-\frac{R^2}{4Q} \quad (21)$$

The signal from the divider 210 is applied to an adder 214 which also receives input signals from the terminals 166 and 200 of the circuits of FIGS. 8 and 10, respectively. The output signal from the adder 214 is applied through a gate 216 to an output terminal 218. The gate is controlled by pulses $P_A$ applied to a terminal 220. Thus, the gate is energized to pass a signal from the adder 214 to the output terminal 218 each time a new fuel is applied to the test engine. In this case, the output signal is representative of the expression in Equation 12 above for the fuel previously applied to the test engine. Accordingly, the output signal at the terminal 218 is representative of the maximum intensity of detonation of each of the fuels applied to the test engine.

*Determining the octane number of the test fuel*

From the maximum detonation intensity determined for each of the reference and test fuels, as achieved by the circuit of FIG. 5 or the circuits of FIGS. 6 through 11, and from the known octane numbers of the reference fuels, the octane number of each of the test fuels may be determined. The determination is made through the use of a calibration curve such as that given in FIG. 3.

The equation of the calibration curve is given as follows:

$$d_{cm}=aN+b \quad (22)$$

wherein $d_{cm}$ represents maximum detonation intensity, N represents octane number, and $a$ and $b$ are constants, with $a$ representing the slope of the calibration curve and $b$ the intercept of the curve with the maximum detonation intensity axis.

It should be noted that Equation 22 is written in the form using octane number N as the independent variable and maximum detonation intensity $d_{cm}$ as the dependent variable. Although octane number is being determined, which would normally be expressed as the dependent variable, maximum detonation intensity is made the dependent variable to minimize the effect of measurement errors in this variable. For an explanation of this statistical approach, see Davies, Statistical Methods in Research and Production, pages 168–170 (3rd edition).

The computations involved are simplified if Equation 22 is written in the following form:

$$d_{cm} = aN + (\bar{d}_{cm} - a\bar{N}) \quad (23)$$

wherein:

$$\bar{d}_{cm} = \frac{1}{m}\sum_{i=1}^{m}(d_{cm})_i \quad (24)$$

$$\bar{N} = \frac{1}{m}\sum_{i=1}^{m}N_i \quad (25)$$

$$b = \bar{d}_{cm} - a\bar{N} \quad (26)$$

With reference to FIG. 3, $m$ is the number of reference fuels, $d_{cm}$ given in Equation 24 is the average maximum detonation intensity of all the reference fuels, and $\bar{N}$ is the average octane number of all the reference fuels.

Solving for N in Equation 23 above, the following equation is developed:

$$N = \frac{d_{cm} - \bar{d}_{cm}}{a} + \bar{N} \quad (27)$$

Equation 27 can be used in two situations, namely, where only one reference fuel is employed in the calibration of the engine and where a plurality of reference fuels is employed. These two situations are treated separately below.

*Determination of octane number—one reference fuel*

With only one reference fuel, $m=1$, and Equation 24 reduces to the maximum detonation intensity for that fuel while Equation 25 reduces to the known octane number of that fuel. Equation 27 then may be written in the following form:

$$N = \frac{(d_{cm})_t - (d_{cm})_r}{a} + N_r \quad (28)$$

wherein $(d_{cm})_t$ is the maximum detonation intensity detected for the test fuel whose octane number is to be determined, $(d_{cm})_r$ is the maximum detonation intensity detected for the reference fuel, and $N_r$ is the known octane number of the reference fuel.

*Computing circuit—determination of octane number—one reference fuel*

Figure 12:
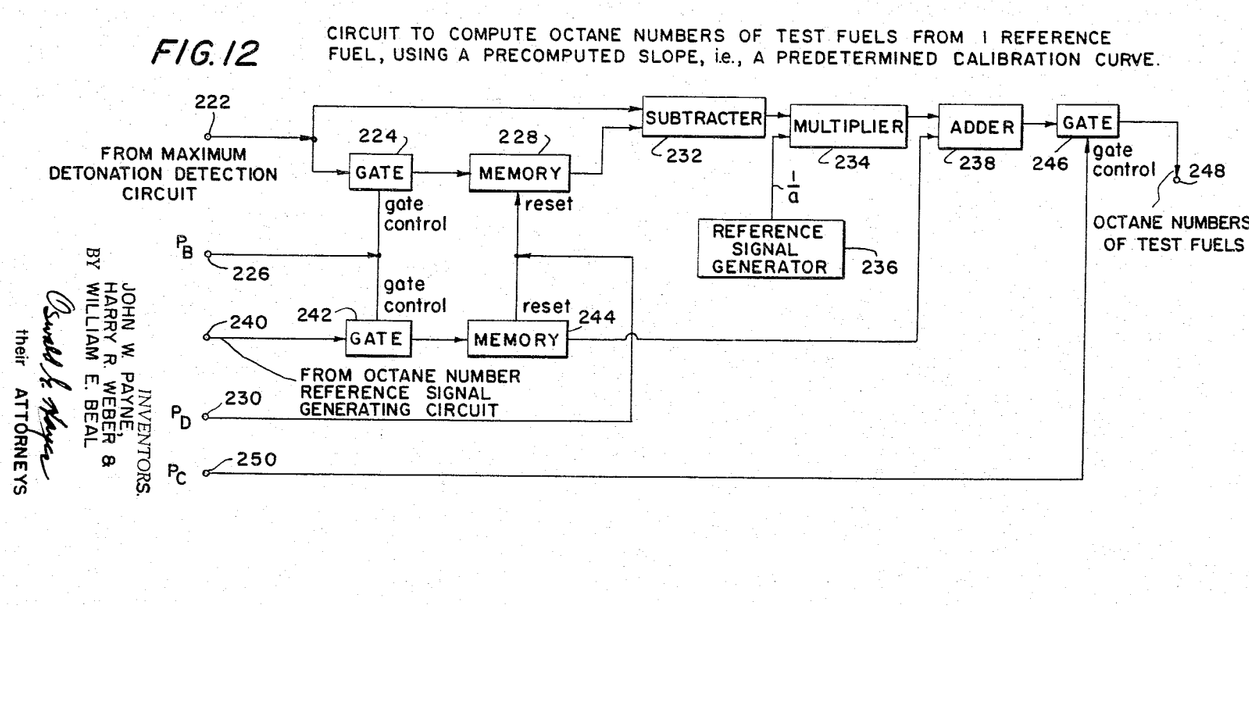
FIG. 12 is a block diagram of a system in accordance with the invention to determine the octane numbers of a plurality of test fuels from data regarding the test fuels and one reference fuel.

The circuit of FIG. 12 carries out the computations of Equation 28. In this case, it is assumed that the engine has been calibrated previously and that the slope factor $1/a$ of the calibration curve is already known.

Referring to FIG. 12, signals representative of the maximum detonation intensities of the reference fuel and one or more test fuels, as generated by the circuit of FIG. 5 or the circuits of FIGS. 6 through 11, are applied to an input terminal 222. The terminal 222 is connected to a gate 224 which receives a gating signal $P_B$ applied to a terminal 226. The pulse $P_B$ may be generated by the circuit of FIG. 4 as explained above, and is present when the reference fuel is applied to the test engine 20. It is assumed that the reference fuel is first applied to the engine, followed by one or more test fuels.

Accordingly, the signal representative of the maximum intensity of detonation of the reference fuel is applied through the gate 224 to a memory 228 wherein it is stored. The memory is reset by a signal applied thereto from a terminal 230, such as the pulse $P_D$ generated by the circuit of FIG. 4, as explained above, at the end of a complete test.

The signal from the memory 228 is applied to a subtractor 232 which also receives signals from the terminal 222. Following the testing of the reference fuel in the test engine, the subtracter generates an output signal representative of the difference between the maximum intensity of detonation of the reference fuel (stored in the memory 228) and the maximum intensity of detonation of each of the test fuels (from the terminal 222).

For each of the test fuels then, the subtracter 232 generates an output signal which is the same as the expression contained in the numerator of the fraction in Equation 28. This signal is applied to a multiplier 234 which also receives a signal from a reference signal generator 236. The signal generator 236, which may comprise a source of potential, for example, generates a signal representative of the factor $1/a$, i.e., the inverse of the slope of the predetermined calibration curve of the test engine 20. The signal from the multiplier 234 is therefore representative of the fraction in Equation 28 above, and this signal is applied to an adder 238.

The adder 238 also receives a signal representative of the octane number of the reference fuel, and this signal is developed as follows. A terminal 240 is connected to the output terminal 90 of FIG. 4. As pointed out above, signals are generated at this terminal representative of the known octane numbers of the reference fuels applied to the engine. In the present case, only one reference fuel is employed, and therefore only a single signal appears at the terminal when the reference fuel is applied to the engine. The terminal 240 is connected to a gate 242 which is gated open by the pulse $P_B$ from the terminal 226. The octane number reference signal is gated through the gate into a memory 244 wherein it is stored and applied to the adder 238. The memory 244 is also reset by the pulse $P_D$ applied to the terminal 230 at the end of a complete testing sequence, as described above.

The signal from the adder 238 is representative of N as given in Equation 28, i.e., the octane number of the test fuel. This signal is applied to a gate 246 and thence to an output terminal 248. The gate 246 is controlled by the signal $P_c$ applied to a terminal 250, which is generated when the test fuels are applied to the test engine 20. As the test engine is supplied sequentially with a plurality of test fuels, a plurality of output signals appear at the terminal 248 representative of the octane numbers of the fuels.

*Determination of octane number—plurality of reference fuels*

When a plurality of reference fuels is employed, Equation 27 is written in the following form, as derived from Equations 24 and 25:

$$N = \frac{(d_{cm})_t - \frac{1}{m}\sum_{i=1}^{m}(d_{cm})_i}{a} + \frac{1}{m}\sum_{i=1}^{m}N_i \quad (29)$$

It will be noted from Equation 29 that the expression $$\frac{1}{m}\sum_{i=1}^{m}(d_{cm})_i \quad (30)$$

is representative of the average maximum detonation intensity detected for all of the reference fuels. It will be also noted that the expression $$\frac{1}{m}\sum_{i=1}^{m}N_i \quad (31)$$

is representative of the average octane number of all the reference fuels. The factor $(d_{cm})_t$ is representative of the detected maximum intensity of detonation of the test fuel whose octane number is to be determined.

From Equation 29, it is apparent that the slope factor $1/a$ of the calibration curve is involved in the computation. It is possible to express $1/a$ in terms of the factors given in expressions (30) and (31) derived from the $m$ reference fuels. In certain instances, however, the engine will already have been calibrated; that is, a curve similar to that of FIG. 3 will have been computed from a number of reference fuels much greater than the $m$ reference fuels in the present test. In this instance, then, it may be more desirable to treat $1/a$ as a predetermined constant rather than to compute it using the terms of expressions (30) and (31).

*Computing circuit—determination of octane number—plurality of reference fuels—assumption of constant value of slope factor $1/a$*

Figure 13:
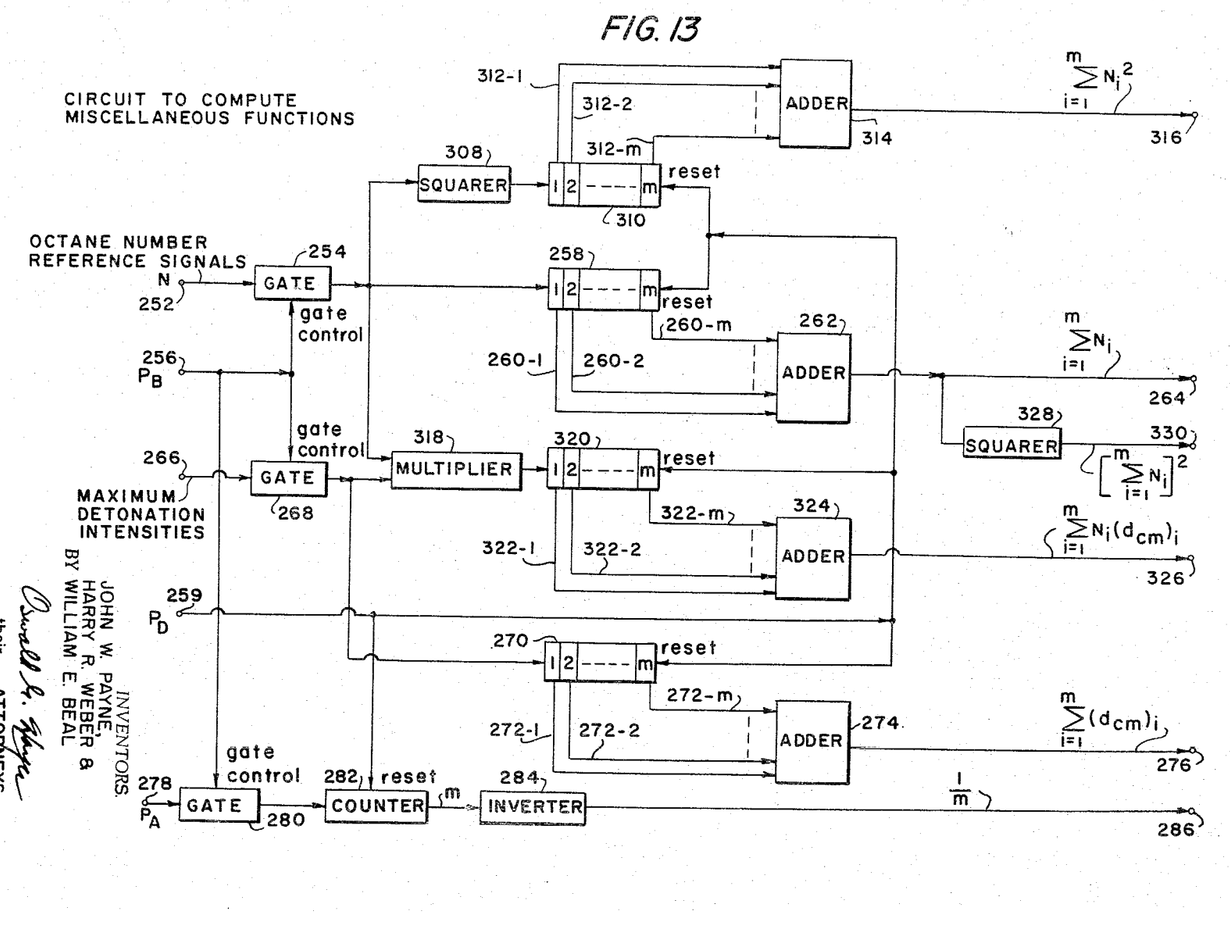
FIGS. 13 and 14 are block diagrams of a system in accordance with the invention for determining the octane numbers of a plurality of test fuels from data regarding the fuels and a plurality of reference fuels.
Figure 14:
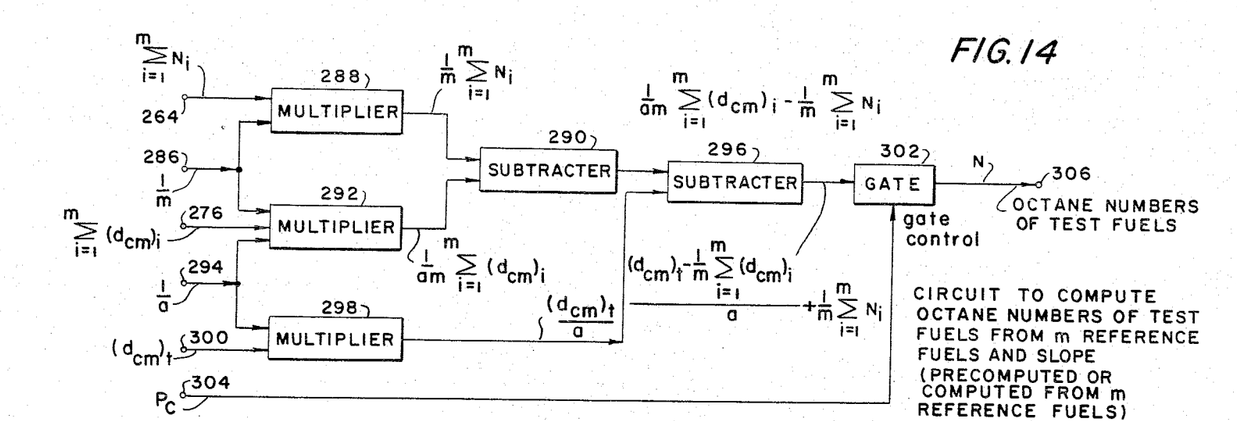

FIGS. 13 and 14 carry out the computations involved in Equation 29 to determine the octane number of one or more test fuels using a plurality of reference fuels and assuming a predetermined slope for the calibration curve of the test engine. It is assumed that the reference fuels are first applied to the test engine, followed by one or more test fuels.

FIG. 13 shows that the octane number reference signals from the circuit of FIG. 4 (the output terminal 90) are applied to a terminal 252 which is coupled to a gate 254. The gate 254 is gated open by the pulse signal $P_B$ appearing at a terminal 256 and generated by the circuit of FIG. 4 as described above during the application of the reference fuels to the test engine. Accordingly, as each of the reference fuels is applied sequentially to the engine, the octane number reference signals are applied through the gate 254 to a memory register 258 which typically contains stages 1, 2 . . . $m$ in which the octane number reference signals are stored. The register is reset by the pulse $P_D$ appearing at an input terminal 259 and generated at the end of a complete testing sequence.

The stages of the register 258 are coupled by conductors 260–1, 260–2 . . . 260–$m$ to an adder 262 which generates an output signal at a terminal 264 representative of the sum of the octane numbers of all the reference fuels.

Signals representative of the maximum intensities of detonation of the fuels applied to the test engine, as developed by the circuit of FIG. 5 or the circuits of FIGS. 6 through 11, are coupled to an input terminal 266 which is connected to a gate 268. The gate 268 is gated open by the pulse signal $P_B$ from the terminal 256, and thus the maximum intensity detonation signals for all of the reference fuels applied to the engine are applied to a memory register 270. The register 270 contains stages 1, 2 . . . $m$ for storing these maximum intensity detonation signals. The register stages are coupled by conductors 272–1, 272–2 . . . 272–$m$ to an adder 274 which generates at an output terminal 276 a signal representative of the sum of the detonation signals of all the reference fuels.

The pulse signals $P_A$ generated by the cycle timer 28 of FIG. 1 to switch the test engine from one fuel to another are applied to an input terminal 278 in FIG. 13 which is connected to a gate 280. The gate 280 is gated open by the pulse signal $P_B$ appearing at the input terminal 256, and thus transmits the pulses $P_A$ during the time that the reference fuels are applied to the test engine. The pulses from the gate 280 are applied to a counter 282 which is reset by the pulse $P_D$ at the end of every complete testing sequence. Accordingly, the counter generates an output signal representative of the number of reference fuels ($m$) applied to the test engine. This signal is applied to an inverter 284 which generates at an output terminal 286 a signal representative of $1/m$.

The output signals generated at the terminals 264, 276, and 286 of FIG. 13 are connected to the same numbered terminals of FIG. 14. FIG. 14 shows that the signals at the terminals 264 and 286 are applied to a multiplier 288 which generates an output signal representative of expression (31) above. The output signal from the multiplier 288 is applied to a subtracter 290 which receives another input signal from a multiplier 292. The multiplier 292 receives input signals from the terminals 286 and 276 and from a terminal 294. The signal at the terminal 294 is representative of the factor $1/a$. As noted above, it is assumed that the slope ($a$) of the calibration curve of the test engine is known, and thus the signal $1/a$ may be generated by a reference signal generator (not shown), such as a source of potential.

The signal from the multiplier 292 is applied to the subtracter 290 to generate an output signal which is applied to another subtracter 296. The subtracter 296 also receives an input signal from a multiplier 298. Input signals to the multiplier 298 are derived from the terminal 294 ($1/a$) and from a terminal 300 to which are applied signals representative of the maximum intensities of detonation of each of the test fuels whose octane numbers are to be determined. These signals may be generated by the circuit of FIG. 5 or the circuits of FIGS. 6 through 11, as described above.

The output signal from the multiplier 298 is applied to subtracter 296 to generate an output signal representative of N in Equation 29 above, i.e., the octane number of each of the test fuels.

The signal from the subtracter 296 is applied to a gate 302 which is controlled by the gating pulse signal $P_C$ applied to a terminal 304. The signal $P_C$ may be generated by the circuit shown in FIG. 4 to open the gate 302 during the time that the test fuels are applied to the test engine. Accordingly, as each of the test fuels is applied to the engine and a test thereof is completed, an output signal is generated at an output terminal 306 representative of the octane number of the test fuel.

*Computation of slope factor $1/a$*

As pointed out above, the slope factor $1/a$ of the calibration curve of the test engine may be computed from the information derived from the $m$ reference fuels supplied to the test engine. Using the method of least squares approximation, it may be shown that the slope factor $1/a$ may be expressed as follows:

$$\frac{1}{a} = \frac{\sum_{i=1}^{m} N_i^2 - \frac{1}{m}\left[\sum_{i=1}^{m} N_i\right]^2}{\sum_{i=1}^{m} N_i (d_{om})_i - \frac{1}{m}\left[\sum_{i=1}^{m} N_i\right]\left[\sum_{i=1}^{m} (d_{om})_i\right]} \quad (32)$$

The terms in Equation 32 are the same as those explained with reference to Equations 22 through 31 above.

*Computing circuits for determining slope factor $1/a$*

Figure 15:
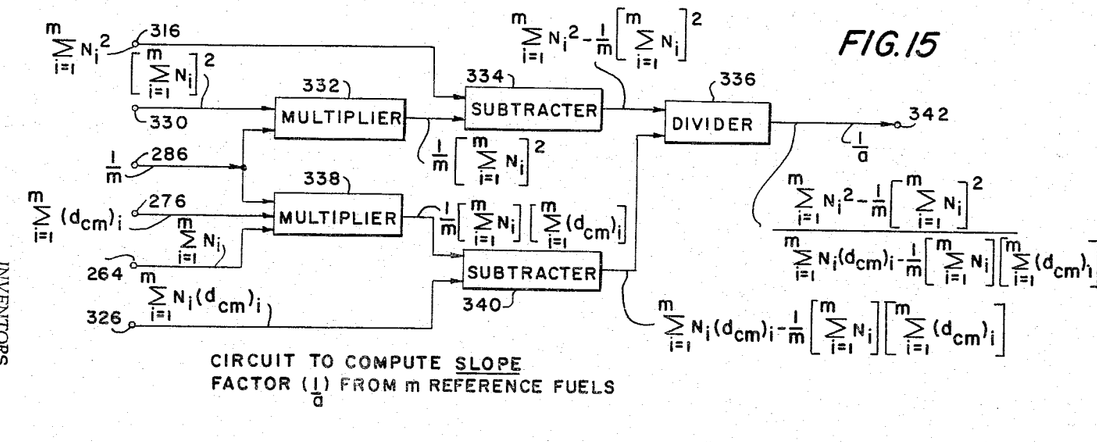
FIG. 15 is a block diagram of a system for determining the slope of the calibration curve of a test engine from data obtained from a plurality of reference fuels.

The circuits of FIGS. 13 and 15 determine the slope factor $1/a$ as given by Equation 32.

Referring to FIG. 13, the signals from the gate 254, representative of the octane numbers of the reference fuels, are applied to a squarer 308. The squarer 308 is connected to a memory register 310 which contains stages 1, 2 . . . $m$ therein for storing the octane numbers of the reference fuels. The register is reset by the pulse $P_B$.

The stages of the memory register 310 are connected by conductors 312–1, 312–2 . . . 312–$m$ to an adder 314. Within the adder 314, the input signals are summed to generate at an output terminal 316 a signal representative of:

$$\sum_{i=1}^{m} N_i^2 \quad (33)$$

The signals from the gate 254 are also applied to a multiplier 318 which receives signals from the gate 268. The multiplier 318 thus generates output signals representative of:

$$N_i (d_{cm})_i \quad (34)$$

The signals from the multiplier 318 are applied to a memory register 320, reset by the pulse $P_D$, containing stages 1, 2 ... m for storing the signals applied thereto. The stages of the memory register are connected by conductors 322-1, 322-2 ... 322-m to an adder 324 wherein they are summed. The adder generates an output signal at a terminal 326 which is representative of:

$$\sum_{i=1}^{m} N_i(d_{cm})_i \qquad (35)$$

FIG. 13 also shows that the signals from the adder 262, representative of the expression $$\sum_{i=1}^{m} N_i \qquad (35a)$$

are applied to a squarer 328 to generate an output signal at a terminal 330 representative of the following expression:

$$\left[\sum_{i=1}^{m}\right]^2 \qquad (36)$$

FIG. 15 shows that the output terminals 330 and 286 of FIG. 13 are connected to a multiplier 332. The output from the multiplier is applied to a subtractor 334 which receives another input signal from the terminal 316 from the circuit of FIG. 13. The output signal from the subtracter 334 is applied to a divider 336.

The terminals 286, 276, and 264 of the circuit of FIG. 13 are coupled to a multiplier 338. The output signal from the multiplier is applied to a subtracter 340 which receives another signal from the terminal 326 of the circuit of FIG. 13. The output signal from the subtracter 340 is applied to the divider 336 which generates an output signal at an output terminal 342 representative of the slope factor $1/a$.

The signal generated at the terminal 342 is connected to the terminal 294 of FIG. 14 to aid in determining the octane numbers of the test fuels applied to the test engine.

SUMMARY

It will be noted that the present invention involves the testing of one or more reference and test fuels, wherein each of the fuels is applied to a test engine, all of whose conditions are fixed except one which is made to vary so that detonation passes through maximum intensity. For each of the fuels, detonation during each of a number of engine cycles is detected and stored, and the stored information is operated upon to determine accurately the maximum intensity of detonation of the fuel. Because of the storage of data, the invention permits the testing of a fuel using only a small quantity of fuel. It should be noted, however, that the invention is not limited to the handling of small fuel quantities, and, in fact, the accuracy of the results increases if more data is obtained through the use of a greater quantity of fuel.

Following the determination of the maximum intensities of detonation of the reference and test fuels, the octane numbers of the test fuels are determined from this information and from information regarding the known octane numbers of the reference fuels.

It is apparent that modifications of the embodiments of the invention described above will suggest themselves to those skilled in the art. Therefore, the invention is not limited to the disclosed embodiments, but is defined by the following claims.

We claim:

1. In a system for detecting the combustion quality of a fuel under test, wherein the fuel is used in a combustible mixture to power a test engine having a repetitive operating cycle, the combination of regulating means for varying the proportion of fuel in the combustible mixture so that it passes through the proportion producing maximum intensity detonation in the engine, means for generating a detonation signal during each operating cycle representative of the intensity of detonation during the cycle, means for storing as a discrete signal the detonation signal for each operating cycle, means for generating signals which are a function of said stored discrete signals, and means for generating a signal representative of the peak value of said function, which indicates the maximum intensity of detonation of the combustible mixture in the engine.

2. Apparatus as recited in claim 1, wherein the means for generating the peak value generates a signal representative of $$\bar{d} - \frac{R^2}{4Q} + S$$

wherein $\bar{d}$ is defined as $$\bar{d} = \frac{i}{j}\sum_{i=1}^{j}(d_a)_i$$

in which $j$ represents the number of stored detonation signals, and $(d_a)_i$ is the magnitude of the $i$th stored detonation signal, wherein R is defined as $$R = \frac{\sum_{i=1}^{j}(d_a-\bar{d})_i(t_a-\bar{t})_i}{\sum_{i=1}^{j}(t_a-\bar{t})_i^2}$$

in which $(t_a)_i$ represents the relative time of occurrence of the $i$th operative cycle, and $\bar{t}$ is defined as $$\bar{t} = \frac{1}{j}\sum_{i=1}^{j}(t_a)_i$$

wherein Q is defined as $$Q = \frac{-j\sum_{i=1}^{j}(d_a-\bar{d})_i(t_a-\bar{t})_i^2}{\left[\sum_{i=1}^{j}(t_a-\bar{t})_i^2\right]^2 - j\sum_{i=1}^{j}(t_a-\bar{t})_i^4}$$

and wherein S is defined as $$S = \frac{\left[\sum_{i=1}^{j}(t_a-\bar{t})_i^2\right]\left[\sum_{i=1}^{j}(d_a-\bar{d})_i(t_a-\bar{t})_i^2\right]}{\left[\sum_{i=1}^{j}(t_a-\bar{t})_i^2\right]^2 - j\sum_{i=1}^{j}(t_a-\bar{t})_i^4}$$

3. Apparatus as recited in claim 1, wherein said function is $$d_i + d_{i-1} + d_{i-2} + \ldots d_{i-h+1}$$

wherein $d_i$ is the magnitude of the stored detonation signal for the $i$th operating cycle, and $h$ is a positive integer greater than unity.

4. The system of claim 1 wherein said regulating means includes a falling-level carburetor.

5. The system of claim 1 which comprises, additional regulating means, and fuel selector means for alternatively connecting each of said regulating means to said engine.

6. The system of claim 1 wherein said means for storing comprises a memory register and said means for generating signals which are a function of said stored discrete signals comprises an adder means.

7. The system of claim 1 wherein said means for storing comprises a memory device which is capable of storing a fixed number of discrete signals and is adapted to store each successive detonation signal by serially discharging therefrom preceding signals in the order in which they were received.

8. In a system for detecting the combustion quality of a test fuel, wherein the test fuel and at least one reference fuel of known combustion quality are sequentially applied to a test engine having a repetitive operating cycle, the combination of means for generating a combustion process signal during each operating cycle representative of the combustion process of the fuel in the engine during the cycle, means for storing as a discrete signal the combustion process signal for each operating cycle, means for generating a plurality of composite signals each representative of the stored combustion process signals for a different one of the reference and test fuels and peak detection means for generating signals responsive to the maximum value of said plurality of composite signals for each of said reference and test fuels.

9. In a system for detecting the octane number of a test gasoline, wherein the test gasoline and at least one reference gasoline of known octane number are successively applied to a test engine having a repetitive operating cycle, each of the test and reference gasolines being applied to the engine in a combustible mixture in which the proportion of gasoline varies and passes through the proportion producing maximum intensity detonation in the engine, the combination of means for generating during each operating cycle of the engine powered by the gasoline a detonation signal representative of the intensity of detonation of the fuel in the engine during the cycle, means for generating a weighted signal representative of the maximum value of a function which represents for each operating cycle of the engine the sum of the full values of the detonation signals for a predetermined number of previous operating cycles, and means responsive to the weighted signals for the reference and test gasolines for generating an output signal representative of the octane number of test gasoline.

10. In a system for detecting the combustion quality of a fuel under test wherein the test fuel and at least one reference fuel are successively used to power a test engine having a repetitive operating cycle, the combination of metering means for controlling the flow of fuel therethrough, selector means for sequentially coupling the test and reference fuels to the metering means, means for coupling the metering means to the test engine to apply fuel to the engine, means for generating a combustion process signal during each operating cycle representative of the combustion process of the fuel in the engine during the cycle, storage means for storing as a discrete signal each of the combustion process signals means for generating weighted signals responsive to the stored discrete signals for a series of operating cycles, means for generating a signal representative of the peak values of said weighted signals of said test and reference fuels.

11. In a system for detecting the combustion quality of test fuels in conjunction with reference fuels, wherein the fuels are used in a combustible mixture to power a test engine having a repetitive operating cycle, the combination of a plurality of falling level carburetors, selector means for sequentially connecting said carburetors to said engine, means to actuate said selector means to deliver fuels to said engine in a predetermined sequence, means for generating a detonation signal during each operating cycle representative of the intensity of detonation during the cycle, means for storing as a discrete signal the detonation signal for each operating cycle, means for successively generating signals representative of a function of series of the stored signals, and means for generating a signal representative of the peak value of the successive signals, which indicates its knocking propensity.

12. In detecting the combustion quality of a fuel, wherein the fuel is used to power a single-cylinder test engine having a repetitive operating cycle, the method which comprises:

delivering the fuel to said engine in a combustible mixture of varying fuel air ratio so that it passes through the proportion producing maximum intensity detonation in the engine generating a signal during each operating cycle representative of the intensity of detonation during the cycle storing as a discrete signal the detonation signal for each operating cycle, and generating a signal representative of the peak value of a function of said stored discrete signals wherein said function comprises composite signals for a series of engine cycles representative of the sum of said stored discrete signals, whereby the peak value of said composite signals indicates the maximum intensity of detonation of the fuel powering the engine.

13. In detecting the combustion quality of a fuel, wherein the fuel is used to power a single-cylinder test engine having a repetitive operating cycle, the method which comprises delivering the fuel to said engine in a combustible mixture of varying fuel air ratio so that it passes through the proportion producing maximum intensity detonation in the engine, generating a signal during each operating cycle representative of the intensity of detonation during the cycle, storing as a discrete signal the detonation signal for each operating cycle, and generating a signal representative of the peak value of a function of said stored discrete signals, wherein said function is representative of a curve fitted to said stored discrete signals whereby the peak value of said curve indicates the maximum intensity of detonation of the fuel powering the engine.

14. The method which comprises performing the steps of claim 12 for one or more reference fuels and then repeating said steps for one or more test fuels, in a predetermined sequence.

References Cited by the Examiner
UNITED STATES PATENTS

| | | | |
|---|---|---|---|
| 2,496,338 | 2/1950 | Barton | 73—35 |
| 2,633,738 | 4/1953 | De Boisblanc | 73—35 |
| 2,888,822 | 6/1959 | Burhans | 73—25 |
| 3,010,313 | 11/1961 | Weller | 73—35 X |
| 3,126,733 | 3/1964 | Heigl et al. | 73—35 |

RICHARD C. QUEISSER, *Primary Examiner.*

JAMES J. GILL, *Assistant Examiner.*